D. O. PAIGE.
APPARATUS FOR HARDENING STEEL.
No. 87,507. Patented Mar. 2, 1869.
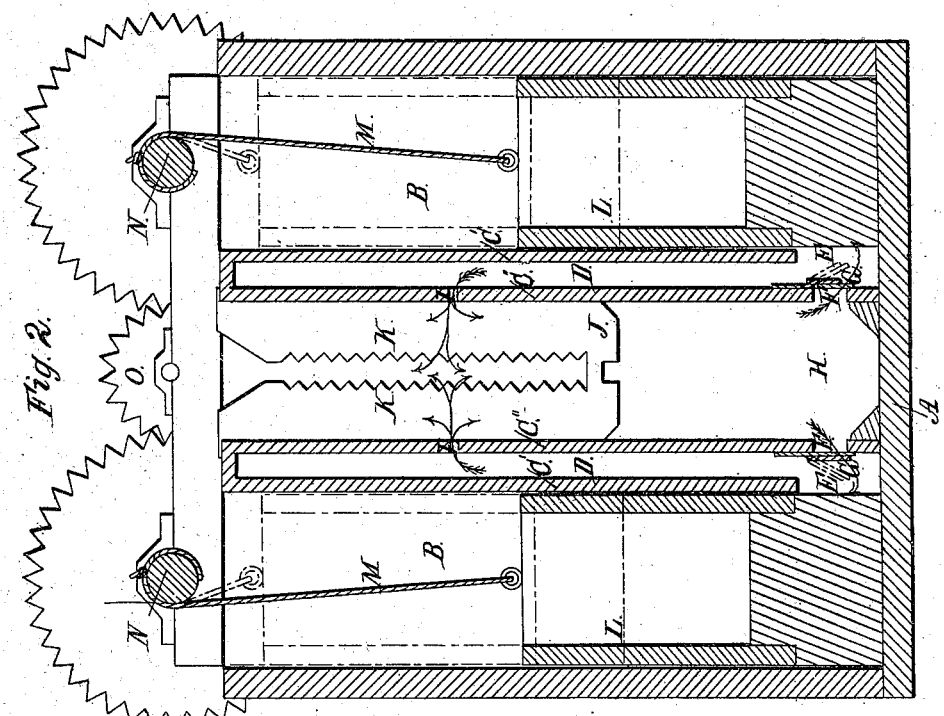
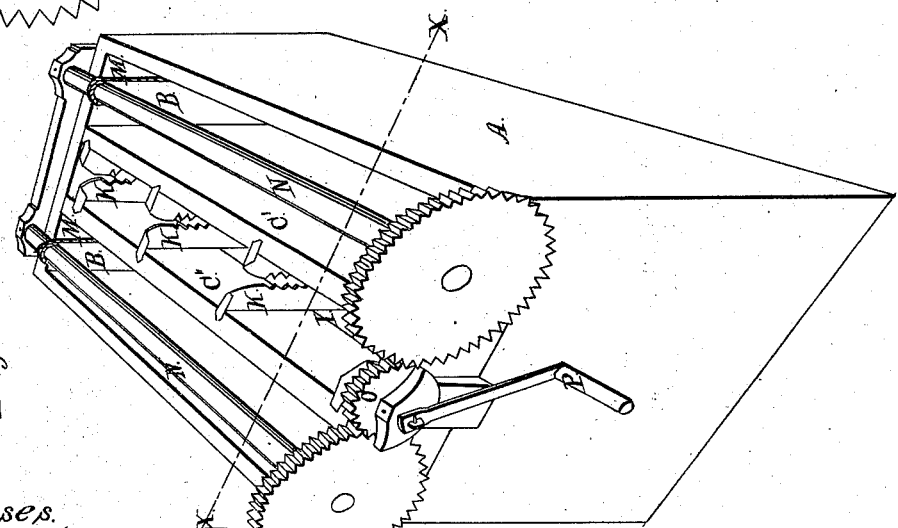
Witnesses.
Inventor.
Daniel O. Paige

DAVID O. PAIGE, OF DETROIT MICHIGAN.

Letters Patent No. 87,507, dated March 2, 1869.

IMPROVEMENT IN APPARATUS FOR HARDENING STEEL.

The Schedule referred to in these Letters Patent and making part of the same.

*To whom it may concern:*

Be it known that I, DAVID O. PAIGE, of Detroit, in the county of Wayne, and State of Michigan, have invented a new and useful Improvement in Hardening Steel; and I do declare that the following is a true and accurate description thereof, reference being had to the accompanying drawings, and to the letters of reference marked thereon, and being a part of this specification.

Figure 1 is a perspective view of my apparatus for hardening steel.

Figure 2 is a vertical sectional view of the same upon the line X X in fig. 1.

Like letters indicate like parts in each figure.

This invention relates to hardening steel plates, of any desired width, by placing the said plates in a suitable box or vat, so arranged that a sheet of water may be injected, through narrow longitudinal openings in each side of the well, in said box or vat, within which the sheet of steel is placed, heated to a proper degree, also, to plungers working in the side chambers of said box or vat; and proper valves, by means of which the sheet of water is injected; and suitable shafts, ropes, or chains, geared wheels, pinion, and crank, by means of which the sheets of water are injected; also, to a series of toothed racks, connected together, and suspended from the top, and which are designed as supports, to hold the plates of steel in position.

A is a rectangular box or vat, composed of two water-tight compartments, B, the inner longitudinal walls, C' C", being double, and provided with space D, extending from top to bottom, and the entire length of the box or vat.

There is an opening, E, at the bottom of the wall C', leading into the adjoining compartments B, while a smaller opening, F, which is controlled by valves G, allows communication with the centre compartment or well, H.

At I are longitudinal slots, extending the whole length of the box, cut through the inner walls, C".

A suitable frame, J, is suspended in the well H, and is provided with a series of toothed racks, K, whose serrated edges project inward, and which are designed to hold the plate of steel in position while being subjected to the water.

Each of the compartments is provided with well-fitting slides or plungers, L, whose bottoms are loaded with iron, in order to compel them to overcome the specific gravity of the water.

These plungers are raised by means of suitable ropes or chains, M, which are secured to them, and attached to shafts N, provided with geared wheels, which engage with the pinion O, deriving motion from the crank P.

The plate of steel being heated to the proper temperature, and inserted in the frame J, between the toothed racks K, the plungers L being elevated, by means of the crank P, as described, and the compartments B being filled with water partially, which water finds the same level in the spaces D, through the openings E, I then disengage the crank, allowing the plungers to descend rapidly, thereby forcing the water to rise in the spaces D, and injecting the same, through the longitudinal slots I, against the centre of the steel plate being operated upon, thereby hardening the same equally.

The water, as it strikes the hot steel plate, flows upward and downward over the surface of the plate, as indicated by the arrows.

When the plate has been hardened, it should be withdrawn, and the plungers drawn up by means of the crank, as described.

The ascent of the plungers creates a vacuum in the compartments, and the atmospheric pressure drives the water out of the well H, through the valves G and openings, into the said compartments, when the pressure of the water closes the valves, and retains the water in the compartments B, when the operation described may be repeated, with another plate of hot steel, as often as may be desired.

Suitable inlet pipes may be attached to the box or vat, to supply it with cold water, and outlet-pipes, to discharge the same as it becomes heated by contact with the hot plates.

By the use of the serrated edges of the holding-racks, I am able to hold the sheet of steel straight, prevent warping, and allow of a free access of the injected sheet of water to the entire length of the sheet of steel.

This method of hardening steel entirely does away with the difficulty experienced in hardening sheets of steel by dipping them in water, which process causes a warping of the sheets, and produces an uneven hardness.

By this process, expansion, which always takes place in hardening steel, is compelled to take place from the centre of the sheet, thereby obviating the liability to fracture, and unequal tension upon its various parts.

The necessity of forcing water against the central portions of the hot sheet of steel is to penetrate the superheated steam, which has a tendency to cling to the surface of the hot steel, thereby bringing it into close, immediate, and continued contact with the steel, at the proper temperature.

What I claim as my invention, and desire to secure by Letters Patent, is—

1. The hardening of sheets of steel, by forcing thin sheets of cold water into contact with the centre of said sheets of steel, substantially as herein described.

2. The plungers L, operated substantially as described, in combination with compartments B and H, valves G, space D, and aperture I, of vat A, when constructed, arranged, and operated substantially as and for the purpose set forth.

3. The frame J, provided with serrated racks K, when constructed and operating substantially as specified, in combination with the well H, and the vat or box A, as herein described and shown.

DAVID O. PAIGE.

Witnesses:
 A. W. RICE,
 H. F. EBERTS.